Feb. 8, 1927.

R. H. CHILTON

STEERING WHEEL

Filed Dec. 31, 1923

Inventor.
Ralph H. Chilton
By Spencer, Sewall & Hardman
his Attorneys.

Feb. 8, 1927. 1,616,681
R. H. CHILTON
STEERING WHEEL
Filed Dec. 31, 1923 2 Sheets-Sheet 2

Inventor.
Ralph H. Chilton
By Spencer, Sewall & Hardman
his Attorneys.

Patented Feb. 8, 1927.

1,616,681

UNITED STATES PATENT OFFICE.

RALPH H. CHILTON, OF DAYTON, OHIO, ASSIGNOR TO THE INLAND MANUFACTURING COMPANY, OF DAYTON, OHIO, A CORPORATION OF DELAWARE.

STEERING WHEEL.

Application filed December 31, 1923. Serial No. 683,535.

This invention relates to handwheels especially such as are ordinarily employed as steering wheels on automotive vehicles.

An object of this invention is to provide a steering wheel having a strong wood spider of improved appearance and which is more economical to manufacture than those heretofore provided.

Another object is to provide an improved method of constructing a wood spider having separate blocks alternately interposed between the inner ends of the spokes and secured thereto to form a hub portion.

Further objects and advantages of the present invention will be apparent from the following description, reference being had to the accompanying drawings, wherein a preferred form of embodiment of the present invention is clearly shown.

Figure 1:
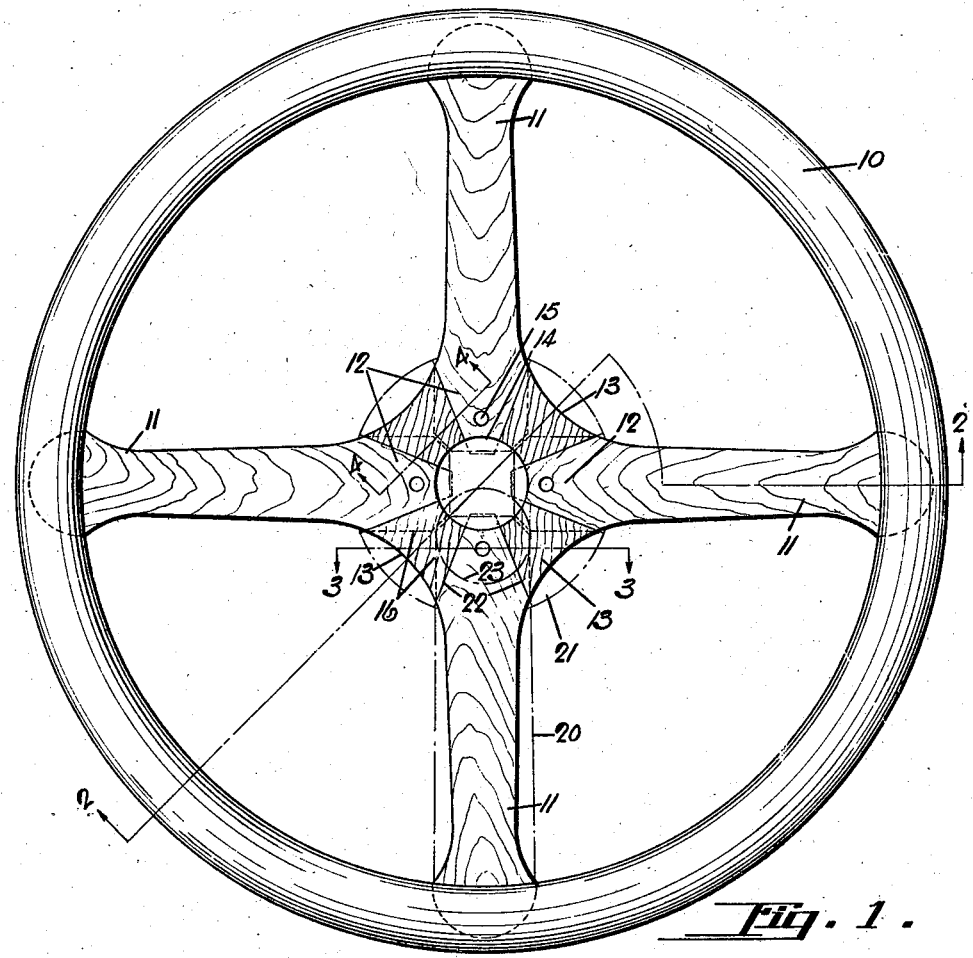
Fig. 1 is a plan view of a steering wheel built according to this invention, and shows in dot and dash lines the outline of the central structure before the central bore is cut therein.
Figures 2, 3:
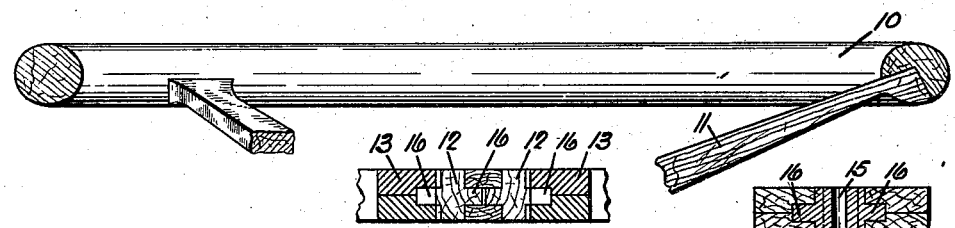
Fig. 2 is a section taken on line 2—2 of Fig. 1.
Fig. 3 is a section taken on line 3—3 of Fig. 1.
Figure 4:
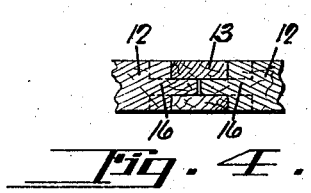

Fig. 4 is a section taken on line 4—4 of Fig. 1.

Figure 5:
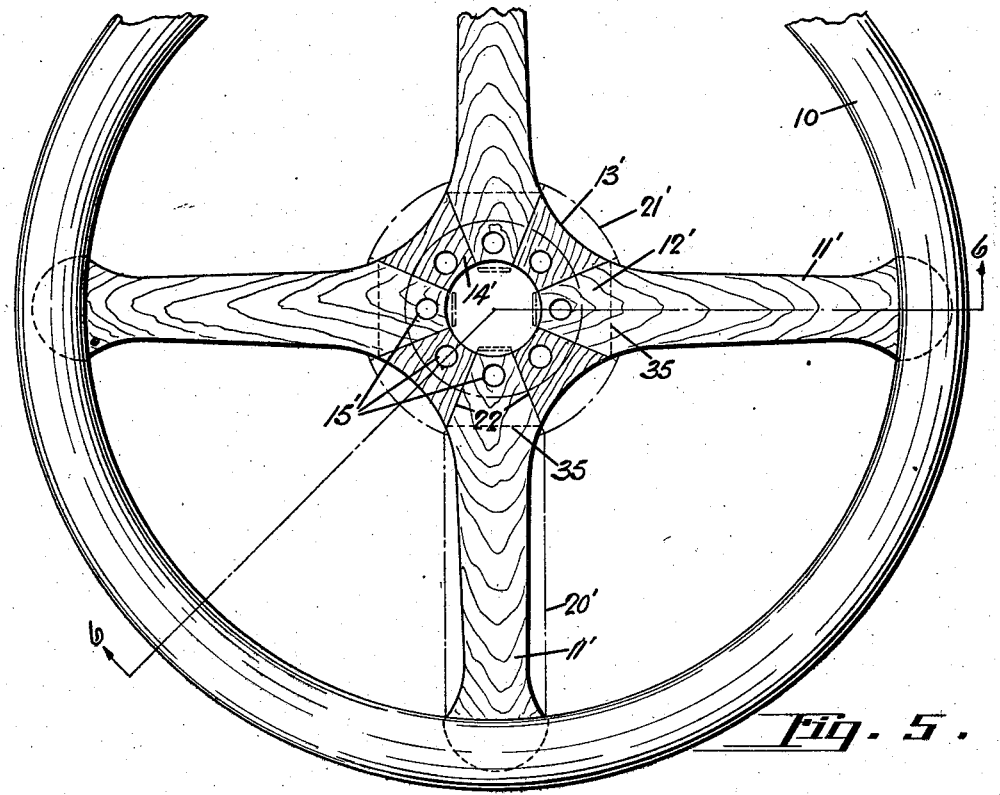

Fig. 5 is a plan view of a modification.

Figure 6:
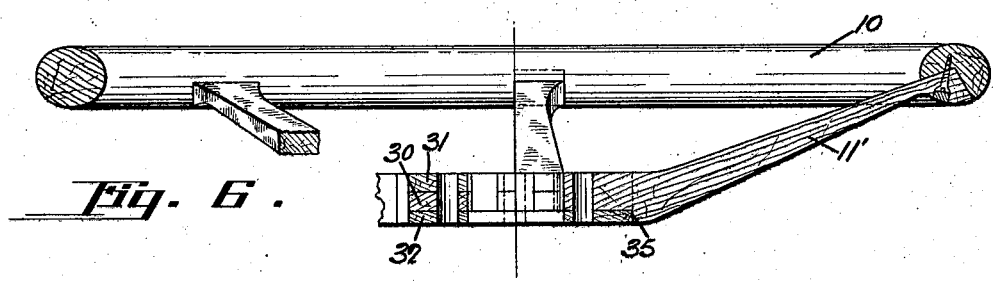

Fig. 6 is a section taken along line 6—6 of Fig. 5.

Figure 7:
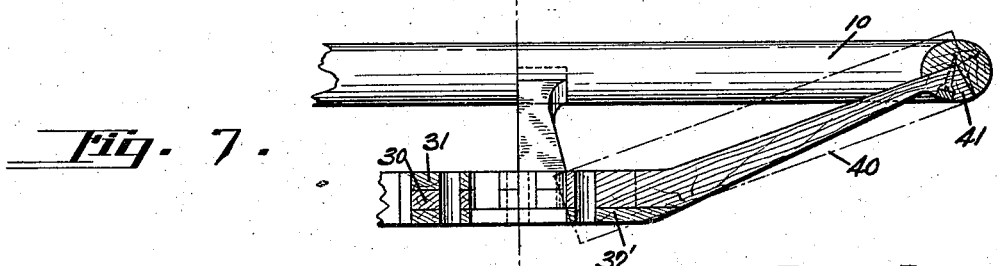

Fig. 7 is a view corresponding to Fig. 6, but shows a slight modification over the wheel shown in Figs. 5 and 6.

In the drawings similar reference characters refer to similar parts throughout the several views.

Numeral 10 designates the wheel rim which may be made according to any well known method. The wheel spider is composed of separate spokes 11 which have their inner ends 12 tapered inwardly, as clearly shown in Fig. 1, and separate blocks 13 lying alternately between the inner ends 13 of the spokes and rigidly secured thereto to form a hub portion. The central bore 14 is pro50 vided for the attachment of a metallic hub (not shown) which may be rigidly secured to the wood hub by means of bolts extending through the holes 15. The blocks 13 are rigidly secured to the inner ends 12 of the spokes preferably by a tongue and groove joint and suitable adhesive means such as water-proof glue. In the form illustrated in Figs. 1 to 4 the spokes are provided with a wide tongue 16 on both sides of their inner ends and the blocks 13 with corresponding grooves into which the tongues 16 fit snugly. Preferably the tongues 16 are cut away so as not to abut one another in order that the radial pressure of the spokes upon the blocks 13 may be taken along the tapered joint between the spokes and blocks and thus obtain a very tight almost invisible joint on the top surface of the central portion.

The method of constructing the spider will now be described. The separate spokes 11 are shaped from wood stock of the width shown by the dot and dash line 20. The inner ends 13 are tapered with the exception of the tongues 16 which preferably have straight sides of substantially the full width of the inner ends 13 of the spokes. A central wood hub portion 21, preferably formed from two or more glued laminations having their grains crossed to give strength, is formed of a size approximately as shown by the dot and dash lines 21 in Fig. 1. Four tapered slots or recesses 22 corresponding to the taper of the inner ends 12 of the spokes are cut in the hub portion 21 and of sufficient depth to permit a clearance between the tips of the spokes and the bottom of the recesses 22. The grooves in the side walls of the recesses 22 corresponding to the tongues 16 on the spokes may then be cut by any suitable means, but preferably by a rotating cutter of the size shown by the dot and dash lines 23 in Fig. 1. It will be seen that this cutter 23 will cut the grooves on both sides of the recess 22 at one operation. The hub portion 21 having been provided with the recesses 22 with their side walls grooved to snugly fit the tongues 16, the spokes 11 have glue applied to their inner ends and are assembled upon the hub portion 21 and are held therein with a strong radial pressure by suitable means until the glue dries. It will be noted that this radial pressure is taken entirely along the tapered joint and not by the spokes abutting the bottom of recesses 22 or by the tongues 16 abutting one another, and hence a very tight practically invisible joint is obtained. After the glue has dried sufficiently the projecting portions of the hub portion 21 are cut down to the desired form to give a well appearing hub portion and the central bore 14 cut therein. In cutting the central bore it will be noted that the bottoms of the recesses 22 are cut entirely away thus dividing the hub portion 21 into four separate blocks 13. Also the tips of the spokes 11 are cut away and arced so that they will fit snugly around the metal hub to be inserted in the bore 14. The bolt holes 15 are preferably cut through the center line of the spokes 11, and if desired may be cut through each of the blocks 13 to more securely hold them in place. The original form of the hub portion 21 may be square, octagonal, or any desired shape so long as it is of sufficient size to form the blocks 13. In the form illustrated the hub portion 21 is composed of two laminations having crossed grains, and with the grain of the top layer set at an angle to each of the spokes 11.

In the modification shown in Figs. 5 and 6 the hub portion 21' is formed consisting of the two upper laminations 30 and 31 which have crossed grain and are glued together to form an integral construction. The tapered recesses 22' are cut therein corresponding to the shape of the tapered ends 12' of the spokes 11'. However no tongue and groove joint between the hub portion and spokes is provided, but the lower surface of the inner ends 12' of the spokes is cut away as shown at the line 35 to snugly fit the lower plate 32 which is glued to the under surfaces of the hub portion 21' and the spoke ends 12' to rigidly hold them together. After the spokes 12', the hub portion 21' and the lower plate 32 are rigidly secured together by adhesive means and sufficiently dried, the projecting portions of the hub portion 21' and the lower plate 32 are cut down to the desired form and the central bore 14' cut therein, as in the modification described above. The clearance spaces in the hub portion 21' at the bottom of the recesses is cut away and the two layers 30 and 31 of the hub portion 21' are divided into separate blocks 13' which are rigidly secured together and to the inner ends 12' of the spokes by the bottom plate 32. The bolt holes 15' are preferably provided at the center line of each spoke end and each block 13' as shown in Fig. 5.

Fig. 7 discloses a slight modification over the form shown in Figs. 5 and 6, the only difference being that the bottom plate 32' instead of abutting a shoulder, as shown at 35 in Fig. 6, extends straight out on the under side of the spoke and has its end surface flush with the lower surface of the dished spoke. This gives increased strength to the spider and reduces the necessary thickness of stock from which the spoke is formed, as shown by the dot and dash lines 40.

In all the modifications of this invention the grain of the spoke is preferably substantially parallel to the top surface of the spokes whereby the spoke strength is increased and the projections at the inner end of the spoke and also at the outer end, shown at 41 in Fig. 7, is less liable to split off. A great advantage in all the modifications of this invention is of course the narrow width of stock, shown by the dot and dash lines 20 and 20' in Figs. 1 and 5 respectively, which is necessary to form the spokes. Also since the joints between the spokes and the separate hub portions lie along radial or approaching radial lines the upper surface of the central portion presents a more pleasing appearance than when said joints lie transversely of the spokes. Furthermore, these joints are more nearly covered by the usual hub cover plate affixed to the top of the metal hub.

While the form of embodiment of the present invention as herein disclosed, constitutes a preferred form, it is to be understood that other forms might be adopted, all coming within the scope of the claims which follow.

What is claimed is as follows:

1. A steering wheel having a rim and a spider, said spider comprising: a plurality of separately formed wood spokes, having laterally tapered inner ends, a plurality of separate wood blocks lying alternately between the inner ends of said spokes and rigidly secured thereto to form a wood hub portion, the inner end surfaces of said spokes and blocks being of arcuate form and together forming a central bore for said steering wheel.

2. A steering wheel having a rim and a spider, said spider comprising: a plurality of separately formed wood spokes, a plurality of wood blocks lying alternately between the inner ends of said spokes and rigidly secured thereto to form a wood hub portion, the inner end surfaces of said spokes and blocks being of arcuate form and together forming a central bore for said steering wheel, and the upper surfaces of said blocks and the inner ends of said spokes lying substantially flush.

3. A steering wheel having a rim, a plurality of wood spokes having inner ends tapered in plan form at their upper exposed surface, and separate wood blocks lying alternately between the inner ends of said spokes, and rigidly secured thereto to form a wood hub portion.

4. A steering wheel having a rim, a plurality of wood spokes having inner ends tapered in plan form at their upper exposed surfaces, and separate wood blocks lying alternately between the inner ends of said spokes, and having their upper surfaces substantially flush with the upper surface of said tapered spoke ends, said spokes and blocks being rigidly secured together by adhesive means.

5. The steps in constructing a spider having a wood hub portion comprising: forming a wood hub with radial recesses cut therein for receiving the inner ends of the spokes, inserting and rigidly securing the inner ends of said spokes therein, and then cutting away the central portion of said hub dividing said wood hub into a plurality of separate parts.

6. The steps in constructing a spider having a wood hub portion comprising: forming a wood hub with radial recesses cut therein for receiving the inner ends of the spokes, inserting and rigidly securing the inner ends of said spokes therein, and then cutting away the central portion of said hub, thus causing said recesses to extend into the central bore of the hub.

7. The steps in constructing a spider having a wood hub portion comprising: forming a wood hub with substantially radial recesses open at the top surface of said hub for receiving the inner ends of the spider spokes, inserting and securing the inner ends of said spokes in said recesses, and then cutting a central bore in said hub sufficiently large to cut away the end wall of said recesses.

8. The steps in constructing a spider having a wood hub portion comprising: forming a wood hub with substantially radial recesses open at the top surface of said hub for receiving the inner ends of the spider spokes, inserting and securing the inner ends of said spokes in said recesses and then cutting a central bore in said hub sufficiently large to cut away the inmost ends of said spokes.

9. The steps in constructing a wood spider comprising: forming a wood hub portion with inwardly tapering substantially radial recesses open at the top surface for receiving the corresponding inner ends of the spider spokes, inserting and securing the inner ends of said spokes in said recesses, and then cutting a central bore in said hub sufficiently large to cut away the inmost ends of said spokes.

10. The steps in constructing a wood spider comprising: forming a wood hub portion with inwardly tapering substantially radial recesses open at the top surface for receiving the corresponding inner ends of the spider spokes, inserting and securing the inner ends of said spokes in said recesses, and then cutting a central bore in said hub sufficiently large to cause said spokes to extend through to said central bore.

11. The method of constructing a wood spider comprising: forming a wood hub portion with inwardly tapering substantially radial recesses open at both top and bottom surfaces of said hub for receiving corresponding inner ends of the spider spokes, inserting and securing the inner ends of said spokes in said recesses, and then cutting a central bore in said hub.

12. The method of constructing a wood spider comprising: forming a wood hub portion with inwardly tapering substantially radial recesses open at both top and bottom surfaces of said hub for receiving corresponding inner ends of the spider spokes, inserting and securing the inner ends of said spokes in said recesses, and then cutting a central bore in said hub sufficiently large to cause said spokes to extend through to said central bore.

13. The method of constructing a wood spider comprising: forming a wood hub portion with inwardly tapering substantially radial recesses open at both top and bottom surfaces of said hub for receiving corresponding inner ends of the spider spokes, inserting and securing the inner ends of said spokes in said recesses and then cutting a central bore in said hub sufficiently large to cause the upper surface of said spokes to extend through to said central bore.

14. A steering wheel comprising a rim and a wood spider having a central bore to facilitate fastening a metallic hub thereto, said spider including: a plurality of wood spokes rigidly secured to the rim and having tapered inner ends, and a plurality of wood blocks lying alternately between the inner ends of said spokes and secured thereto to form a hub portion, the upper and lower surfaces of said blocks lying flush with the upper and lower surfaces of said spokes thus forming the upper and lower surfaces of the hub portion.

15. A steering wheel comprising a rim and a wood spider having a central bore to facilitate fastening a metallic hub thereto, said spider including: a plurality of wood spokes rigidly secured to the rim and having tapered inner ends, and a plurality of wood blocks lying alternately between the inner ends of said spokes and secured thereto by a tongue and groove connection to form a hub portion, the upper and lower surfaces of said blocks lying flush with the upper and lower surfaces of said spokes thus forming the upper and lower surfaces of the hub portion.

16. A steering wheel comprising a rim and a wood spider having a central bore to facilitate fastening a metallic hub thereto, said spider including: a plurality of wood spokes rigidly secured to the rim and extending to said central bore, and a plurality of wood blocks lying alternately between the inner ends of said spokes and secured thereto by a tongue and groove connection to form a hub portion, the upper and lower surfaces of said blocks lying flush with the upper and lower surfaces of said spokes thus forming the upper and lower surfaces of the hub portion.

17. A steering wheel comprising a rim, a plurality of wood spokes rigidly secured to said rim, a plurality of wood blocks lying alternately between the inner ends of said spokes and rigidly secured thereto to form a hub portion, said spokes and blocks having arc shaped inner ends which together form a central bore through the hub.

18. A steering wheel comprising a rim, a plurality of wood spokes rigidly secured to said rim, a plurality of wood blocks lying alternately between the inner ends of said spokes and rigidly secured thereto to form a hub portion, said spokes having tapered upper exposed surfaces at their inner ends and intermeshing joints with said blocks.

19. A steering wheel comprising a rim, a plurality of wood spokes rigidly secured to said rim, a plurality of wood blocks lying alternately between the inner ends of said spokes and rigidly secured thereto to form a hub portion, said spokes having tapered upper exposed surfaces at their inner ends and tongues projecting from each side surface of the inner ends intermeshing with grooves in said blocks.

20. A steering wheel having a rim, a plurality of radially disposed spokes having their outer extremities connected with said rim and having their inner extremities disposed adjacent to one another at the center of the said rim, the inner extremities of said spokes having converging walls disposed at an angle of less than ninety degrees to each other, whereby to provide wedge-shaped spaces between the extremities of adjacent spokes, and wedge members between said adjacent extremities.

21. In combination, a steering wheel rim, spokes connected with said rim and converging toward the center thereof, and wedges disposed between the inner extremities of said spokes.

In testimony whereof I hereto affix my signature.

RALPH H. CHILTON.